United States Patent [19]

Keys et al.

[11] Patent Number: 4,999,951
[45] Date of Patent: Mar. 19, 1991

[54] MAGNETIC WINDOW SEAL ASSEMBLY

[75] Inventors: James F. Keys, Port Clinton, Ohio; Thomas L. Gustafson, Pleasant Ridge, Mich.

[73] Assignee: The Standard Products Company, Cleveland, Ohio

[21] Appl. No.: 481,676

[22] Filed: Feb. 20, 1990

Related U.S. Application Data

[63] Continuation of Ser. No. 272,484, Nov. 16, 1988, abandoned.

[51] Int. Cl.5 .................................................. E06B 7/16
[52] U.S. Cl. .......................................... 49/478; 49/374
[58] Field of Search .................. 49/478, 502, 375, 374, 49/227; 296/146

[56] References Cited

U.S. PATENT DOCUMENTS 4,192,101  3/1980  White .................................... 49/478
4,592,180  6/1986  Gerritsen ......................... 49/478 X Primary Examiner—Philip C. Kannan
Attorney, Agent, or Firm—Harness, Dickey & Pierce

[57] ABSTRACT

A magnetic window seal assembly for frameless and full flush window systems of automotive vehicles comprises a flexible sealing strip having a compressible body portion with a first magnetic element embedded therein mounted to the vehicle body. A complementary second magnetic element is provided on the lateral edge of the window being sealed. When in sealing engagement with the windowpane and the vehicle, the body portion of sealing strip is compressively tapered along its length, being more tapered or compressed at the roofline than at the beltline of the vehicle. The tapered configuration of the sealing strip and its compressibility at the beltline accommodates transverse or lateral inward movement of the beltline edge of the windowpane to allow the opening of the window by a camming mechanism without undue compressive resistance to such action.

14 Claims, 3 Drawing Sheets

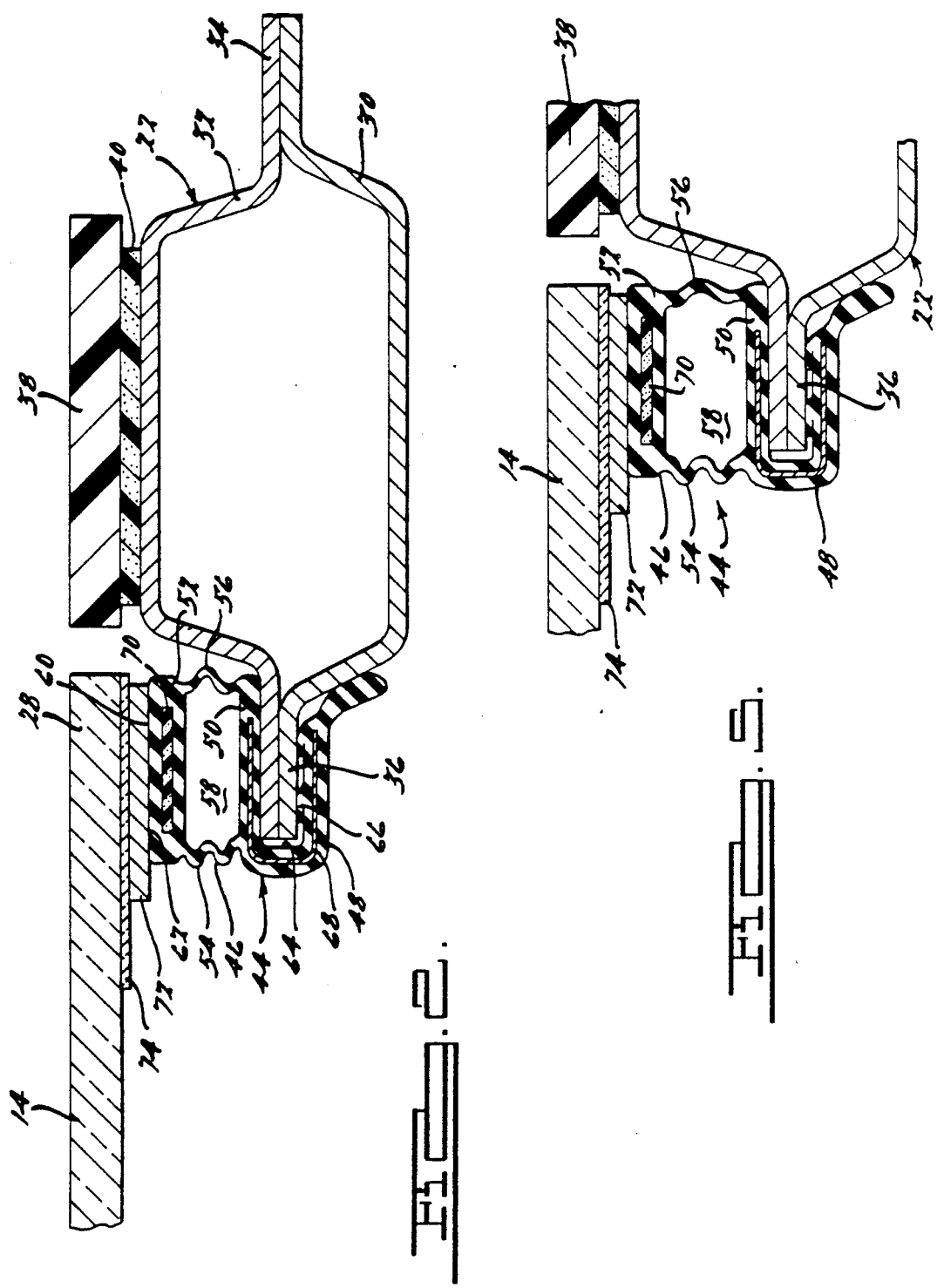

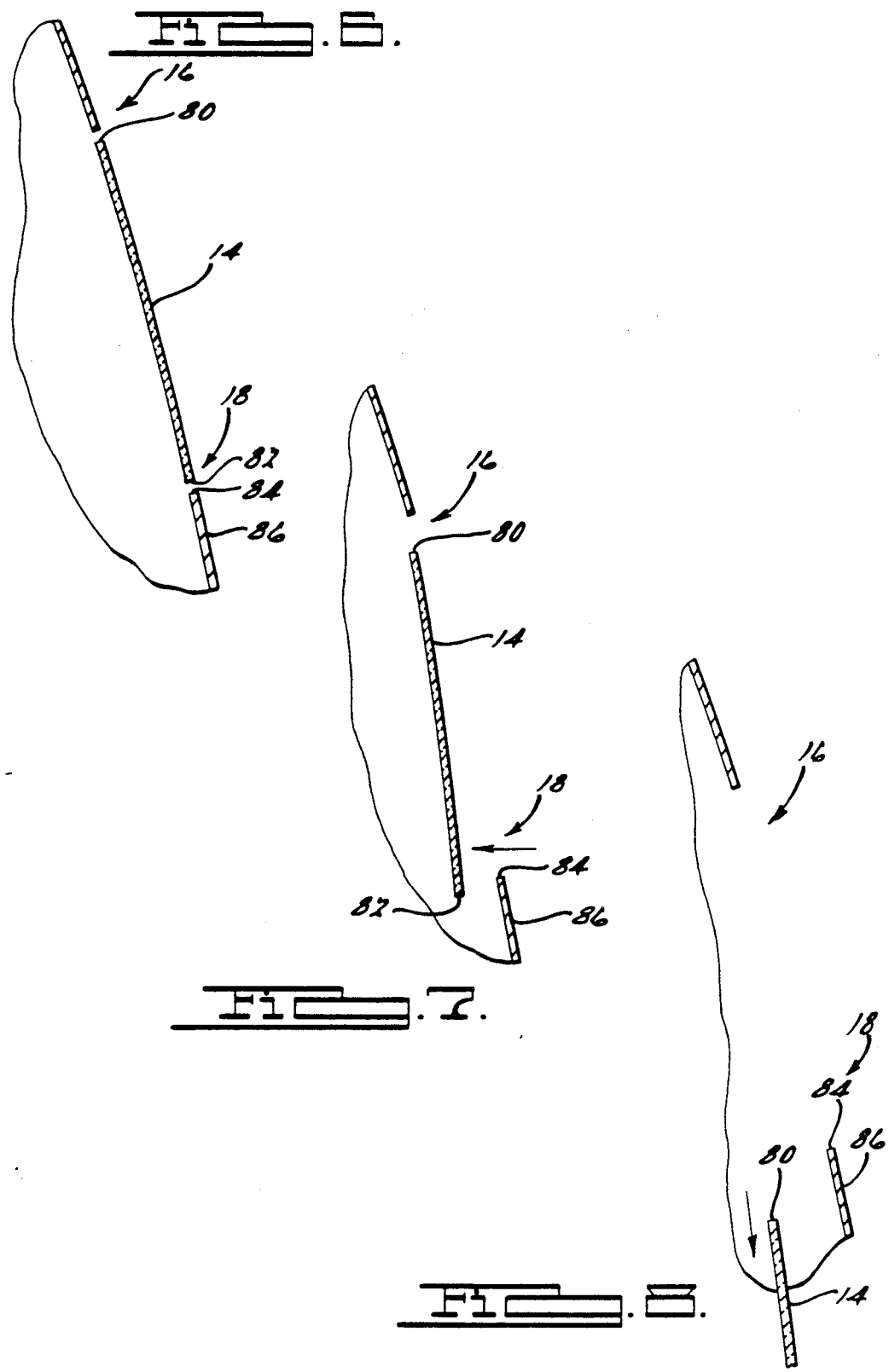

MAGNETIC WINDOW SEAL ASSEMBLY

This is a continuation of U.S. patent application Ser. No. 272,484, filed Nov. 16, 1988 entitled "Magnetic Window Seal Assembly", now abandoned.

BACKGROUND OF THE INVENTION

The present invention relates generally to seals for movable windowpanes in automotive vehicles. More particularly, the present invention relates to a frameless window assembly using a magnetic seal and having a movable windowpane capable of having all edges flush with the adjacent vehicle body panel.

In recent years there has been much interest in aerodynamically designed automotive vehicles having windowpanes with all edges substantially flush (hereinafter referred to as "full flush") with the vehicle body. One such system is described in U.S. Application No. 272,566 entitled "Four-Sided Flush Glass Assembly" filed by Keys et al. on Nov. 16, 1988, and which is specifically incorporated herein by reference. Full flush window systems, however, pose unique problems with respect to windowpane movement. For example, since a full flush windowpane is flush with the vehicle body at the beltline, opening of the window requires lateral or transverse inward movement of the windowpane at the beltline prior to its descent into the tracking channel in the vehicle door. Conventional framed automotive windows do not permit such lateral or transverse movement of the windowpane. Although elimination of window framework to allow for such movement would circumvent this problem, it is difficult to achieve a satisfactory window seal in frameless systems using conventional sealing techniques.

For example, automotive windows are conventionally sealed using elastomeric strips which depend primarily upon compression for their sealing force. In frameless window systems, the use of conventional sealing strips generally requires higher compression to form an adequate seal, making it difficult to open and close the windows of the vehicle. Moreover, repeated compression of a sealing strip, particularly one requiring high compressive force for sealing, shortens the effective sealing life of the strip. If less compression of the strip is used to offset these problems, the integrity of the seal between the windowpane and vehicle body is reduced. This leads to increased windowpane flutter, wind noise and air entering the passenger compartment during operation of the vehicle.

One alternative to compression-dependent sealing involves the use of magnetic elements in the sealing arrangement. Conventional magnetic seals such as that proposed in U.S. Pat. No. 4,535,563 to Mesnel, do not, however, offer an adequate solution to the sealing problems encountered in full flush or frameless window systems. For example, in frameless systems the windowpane is sealed directly to the automotive body and opening of the vehicle door requires breaking the seal between the windowpane and the vehicle. If the windowpane is sealed to the body using a conventional magnetic sealing arrangement, opening the vehicle door is difficult since the magnetic seal must be broken at all points simultaneously. In addition, in full flush window systems having lateral or transverse windowpane movement at the beltline, conventional magnetic sealing assemblies offer undue resistance to such movement. The resistance can be so great as to prevent use of a conventional camming mechanism for lateral or transverse windowpane movement.

Thus, it would be desirable to provide a window seal assembly suitable for a full flush or a frameless window system having a satisfactory seal between the window and the automotive body. It would also be desirable to provide a window seal assembly in which the sealing force is not entirely dependent upon the compression of the sealing member. It would further be desirable to provide a satisfactory window seal assembly for a window which is opened and closed by a camming mechanism, in which the sealing member does not offer undue compressive resistance to lateral or transverse movement of the windowpane at the beltline. It would also be desirable to provide a magnetic window seal assembly for a frameless system in which the door can be easily opened with the windowpane in the ascended, i.e. window opening closed, position.

SUMMARY OF THE INVENTION

The magnetic window seal assembly of the present invention comprises an elongated flexible sealing strip which is mounted to the vehicle body and which has a compressible body portion with a first magnetic element embedded therein. A complementary second magnetic element is provided on the lateral edge of the window being sealed. When in sealing engagement with the windowpane and the vehicle, the body portion of sealing strip is compressively tapered along its length, being more tapered or compressed at the roofline than at the beltline of the vehicle. The tapered configuration of the sealing strip and its compressibility at the beltline accommodates transverse or lateral inward movement of the beltline edge of the windowpane to allow the opening of the window by a camming mechanism without undue compressive resistance to such action.

The window seal assembly of the present invention thus includes a first magnetic element attached to or embedded in the sealing strip and a complementary second magnetic element attached to or embedded in a free lateral edge portion of the windowpane. By complementary is meant that the first and second magnetic elements will form a magnetic seal when adjacently positioned. When the vehicle door is closed with the windowpane in the ascended position, a magnetic seal is formed between the window and the vehicle body by the magnetic attractive forces between the first and second magnetic elements of the window seal assembly of the invention. The tapered configuration of the sealing strip also provides for tear-away action of the magnetic seal beginning at the less compressed beltline portion, which facilitates the opening of the vehicle door with the windowpane in the ascended position.

Thus, in one aspect, the window seal assembly of the present invention provides a satisfactory seal for a frameless or full flush window system having a movable windowpane which is opened and closed with lateral to transverse movement. In another aspect, the window seal assembly of the present invention provides a sealing assembly which does not offer undue compressive resistance to lateral to transverse movement of the windowpane at the beltline. In still another aspect, the window seal assembly of the present invention provides a magnetic seal for a frameless window system in which the sealing force does not depend entirely upon the compression of the sealing member. In yet another aspect, the window seal assembly of the present invention provides a tear-away magnetic seal to ease the opening of the vehicle door with the windowpane in the ascended position.

These and other advantages of the present invention will be understood from the following description of the preferred embodiments taken in conjunction with the drawings and appended claims.

BRIEF DESCRIPTION OF THE DRAWINGS

FIG. 2 is a cross-sectional view, broken away, taken along line 2—2 of FIG. 1, illustrating a preferred embodiment of the magnetic window seal assembly of the present invention.

FIG. 5 is a cross-sectional view taken along the line 5—5 of FIG. 1, illustrating the tapering of the sealing strip of FIG. 2 when in sealing engagement with windowpane and B pillar.

FIGS. 6–8 are schematic representations of the lateral or transverse movement of a fully flush windowpane at its beltline edge and its descent into a vehicle door.

DETAILED DESCRIPTION OF THE PREFERRED EMBODIMENTS

Figure 1:
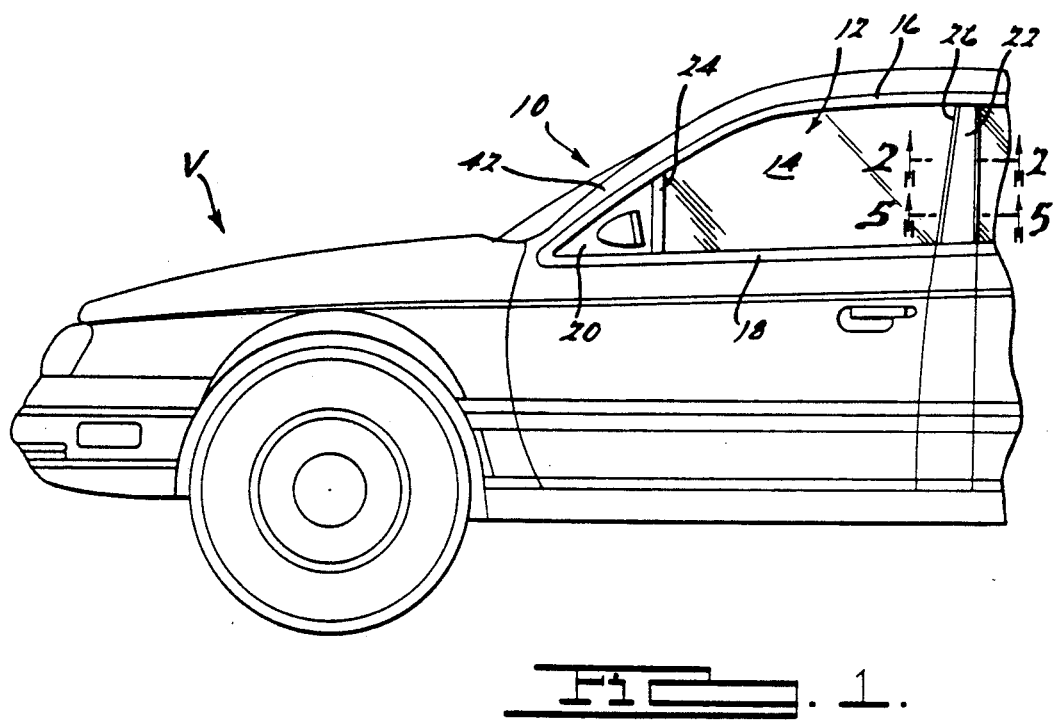
FIG. 1 is a partial side view of an automotive vehicle having a frameless window system with a movable windowpane shown in the fully ascended position.

Referring first to FIG. 1, an automotive vehicle V with a frameless window system denoted generally by the numeral 10 is shown. Automotive vehicle V has a window opening 12 for a side windowpane 14. Window opening 12 is generally defined by roofline 16, beltline 18, mirror panel 20, and B pillar 22, with mirror panel 20 and B pillar 22 respectively defining the forward 24 and rearward 16 tracking lines for windowpane movement. When side windowpane 14 is in an ascended position, i.e. window opening closed, window seal assembly 10 sealingly engages the lateral edge portions of windowpane 14 adjacent to mirror panel 20 and B pillar 22.

Turning now to FIG. 2, which is a partial cross-section taken along the line 2—2 of FIG. 1, window seal assembly 10 of the present invention is shown engaging lateral edge portion 28 of windowpane 14 and B pillar 22. As shown in FIG. 2, B pillar 22 generally comprises inner sheet metal 30 and outer sheet metal 32 pinch-welded together to form pillar flanges 34 and 36. A decorative applique 38 of glass or plastic or the like can be attached to the outer surface of B pillar 22 by conventional means such as an adhesive 40 or double-sided adhesive tape.

Mirror panel 20 also generally comprises two sheets of metal pinch-welded together to form a panel flange (not shown in the Figures), generally extending along forward tracking line 24, which provides a point of attachment for window seal assembly 10, similar to B pillar flange 36 described below. Thus, although window seal assembly 10 of the present invention is described below in relation to lateral edge 28 of windowpane 14 and flange 36 of B pillar 22, it should be understood that a similar arrangement of window seal assembly 10 is provided between the flange of mirror panel 20 and the lateral edge portion of windowpane 14 proximate thereto. It should also be appreciated that in vehicles lacking a mirror panel, window seal assembly can instead directly engage the A pillar 42 of the vehicle. Alternatively, any panel, pillar or the like providing a forward tracking line for windowpane and a suitable point of attachment for window seal assembly as described below can be utilized.

As shown in FIG. 2, window seal assembly 10 comprises a flexible sealing strip 44 which, in the section shown in FIG. 2, is mounted on flange 36 of B pillar 22. Sealing strip 44 comprises a generally tubular body portion 46 and a U-shaped mounting portion 48 extending from and sharing common wall 50 with body portion 46. As shown in FIG. 2, common and outer walls 50, 52 and side walls 54, 56 cooperate to define a hollow body interior 58 which extends at least substantially the entire length of sealing strip 44. The hollow tubular structure and side wall bellows of body portion 46 permit variable compression and expansion of body portion 46 of sealing strip 44 by an "accordian-like" action.

Sealing strip 44 of the present invention can be constructed of a conventional elastomeric material suitable for use in the sealing strip art. Suitable materials include polyvinyl chloride, natural or synthetic rubber, or the like. Preferably sealing strip 44 is comprised of rubber. Outer wall 52 of sealing strip 44 can also include a friction-reducing coating on its outer surface 60 to facilitate sliding of windowpane 14 into its ascended or descended positions. Alternatively, a friction-reducing coating can be provided on the opposing surface 62 of the second magnetic element 72 (to be described below), or on both surfaces 60 and 62. Suitable coating materials including low-friction coatings such as teflon, polyurethane and silicon, or flocking comprises of nylon or polyester.

As further shown in FIG. 2, U-shaped mounting portion 48 of sealing strip 44 defines a U-shaped channel 64 for mounting sealing strip 44 onto flange 36 of B pillar 22. U-shaped mounting portion 48 is also provided with one or more gripping ribs 66 extending into U-shaped channel 64 which help maintain sealing strip 44 in position on flange 36. It is also preferred that sealing strip 44 be provided with a metal core element 68, as is conventional in the art, for additional structural and gripping strength.

As shown in FIG. 2, sealing strip 44 further comprises a first magnetic element 70 embedded in outer wall 52 of body portion 46. Magnetic element 70 generally comprises either a permanent magnet or a ferrous material such as iron or steel. Although first magnetic element 70 may be in the form of a strip, particles, powder or the like, magnetic element 70 is preferably provided in the form of a strip which extends substantially the length of sealing strip 44. Most preferred are flexible elastomeric magnets such as those commonly used in refrigerator seals and which can be coextruded with sealing strip 44.

Referring again to FIG. 2, window seal assembly 10 further comprises a second magnetic element 72 complementary to first magnetic element 70, mounted onto lateral edge portion 28 of side windowpane 14. Windowpane 14 is preferably provided with a ceramic layer 74 to which second magnetic element 72 is adhesively attached. Second magnetic element 72 also comprises a permanent magnet or a ferrous material as described with respect to first magnetic element 70.

Figure 3:
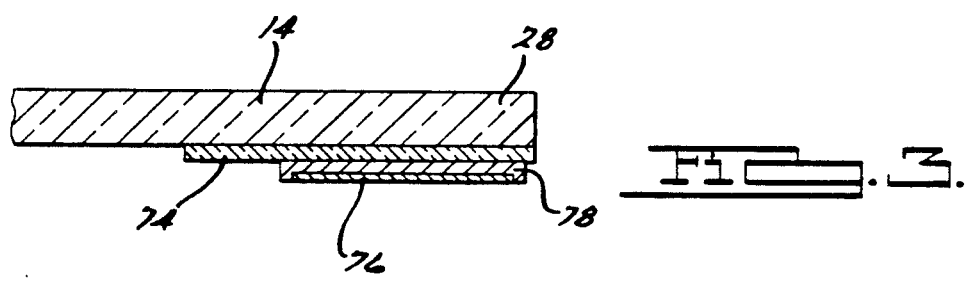
FIG. 3 is a cross-sectional view of an alternative preferred embodiment of the second magnetic element of the present invention.

An alternative embodiment of second magnetic element 76 mounted on edge portion 28 of windowpane 14 is depicted in FIG 3. In FIG. 3, second magnetic element 76 is provided with a nonmagnetic rim 78 which is in turn attached or adhesively bonded to ceramic layer 74. Alternatively (not shown in the Figures), the second magnetic element can be provided directly in the ceramic layer by the addition of iron powder, magnetic particles, and the like, or can be directly attached to the window without an intermediate ceramic layer.

Although it is preferred that one of the magnetic elements is a permanent magnet while the other is a ferrous metal, in accordance with the present invention both elements can be permanent magnets. In such case, care should be taken in mounting the first and second magnetic elements on the vehicle so that the magnetic flux of first and second magnetic elements be oriented in inverse directions, i.e. with opposite poles adjacent to each other so that the first and second magnetic elements will be attracted to each other. If permanent magnets with multiple pole magnetism patterns are used for magnetic elements, their orientation must be vertical such that each magnetic field is continuous for the entire length of the sealing portion strip. It should also be appreciated that, although first and second magnetic elements herein described preferably comprise combinations of permanent magnets and ferrous materials, the magnetic aspect of the window seal assembly of the present invention can instead be provided by electromagnetic means.

Figure 4:
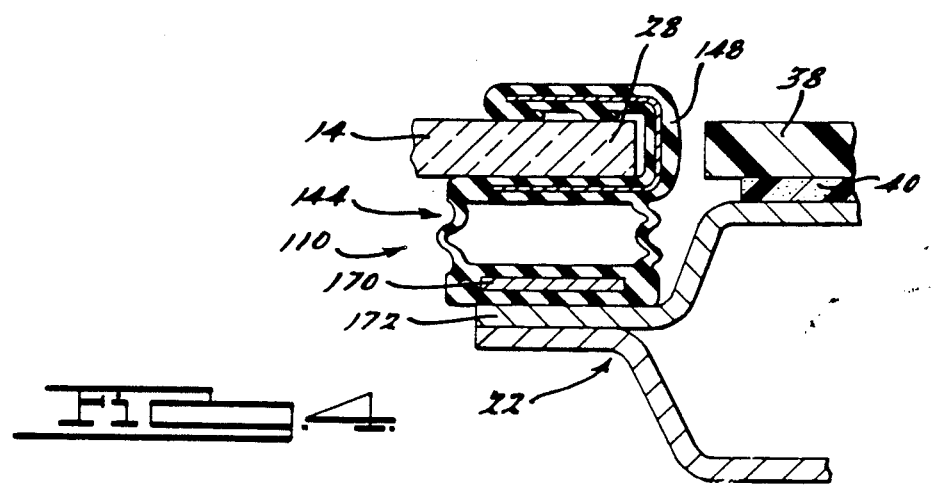
FIG. 4 is a cross-sectional view, broken away, similar to FIG. 2, but showing an alternative preferred embodiment of the magnetic window seal assembly of the present invention.

Turning now to FIG. 4, another preferred embodiment of the magnetic window seal assembly of the present invention is shown and denoted generally by the numeral 110. As in the embodiment depicted in FIG. 2, window seal assembly 110 also comprises a flexible sealing strip 144 with a first magnetic element 170 embedded therein. In the embodiment shown in FIG. 4, however, sealing strip 144 is mounted directly on lateral edge portion 28 of side windowpane 14 by its U-shaped mounting portion 148. Second magnetic element 172 can be provided by the metal of the B pillar 22 of the vehicle body as shown in FIG. 4, or alternatively, in the form of a strip of magnetic or ferrous material (not shown in the Figures) attached thereto.

Referring now to FIGS. 2 and 5, cross-sections of window seal assembly 10 taken along lines 2—2 and 5—5 of FIG. 1, respectively, the operation of window seal assembly of the present invention in sealing engagement with windowpane 14 and B pillar 22 can be further understood. When in sealing engagement, body portion 46 of flexible sealing strip 44 is compressively tapered along tis length. As shown by FIGS. 2 and 5, when in position on B pillar 22, hollow body portion 46 of sealing strip 44 is increasingly compressed and decreases in width as it ascends from beltline 18 toward roofline 16 of vehicle. By sealing strip width is meant the distance between outer wall 52 and common wall 50 of body portion 46. It should also be appreciated that this tapering can also be obtained or enhanced by providing a structurally tapered sealing strip in which the width of bellowed side walls 54, 56, and consequently the cross-sectional area of hollow interior 58 of body portion 46, is decreased as sealing strip 44 ascends from beltline 18 toward roofline 16. The compressibility of sealing strip 44 and its tapered configuration when in sealing engagement, as discussed below in greater detail, allows for the use of a camming mechanism for movement of a full flush window and, in addition, provides for a tear-away action of the magnetic seal of the present invention.

Turning now to FIGS. 6–8, a schematic representation of the opening a full flush frameless window system by a camming mechanism is shown. FIG. 6 shows windowpane 14 in an ascended or closed position. Upon opening of the window, as shown in FIG. 7, windowpane 14 pivots at its transverse roofline edge 80, allowing beltline edge 82 of windowpane 14 to move laterally or transversely inwardly (hereinafter referred to as a "camming" action), toward the passenger compartment. Once beltline transverse edge 82 of windowpane 14 has moved inward sufficiently to clear the beltline edge 84 of the vehicle door 86, windowpane 14 can begin its descent into a window tracking channel (not shown in Figures) within the door, as shown in FIG. 8.

At the beginning of the camming action of movable windowpane 14, transverse roofline edge 80 of windowpane 14 must be held relatively stably in place to provide a pivot point for the windowpane's inward movement at the beltline. In addition, the window sealing mechanism at the lateral edges of windowpane 14 must allow for the lateral or transverse movement of the windowpane 14 at its transverse beltline edge 82 so that the camming action for the opening of the window is not impeded. Both of these features are provided by the window seal assembly of the present invention more fully as described below.

As described previously, due to the variable compression or tapered structure of the body portion of the sealing strip, there is a decrease in the relative compressibility of the body portion at the roofline 16. This decrease in relative compressibility of the sealing strip at the roofline stabilizes the transverse roofline edge 80 of windowpane 14 at the windowpane's uppermost lateral sealing points, creating a hinge-like effect and permitting windowpane 14 to stably pivot at the roofline 16. Although decreased compressibility of the sealing strip at the roofline 16 is desired, it is preferred that the sealing strip stop short of full compression or, if structurally tapered, short of a full taper, i.e. retaining some bellows in side walls 54, 56 at the roofline portion, in order to maintain good contact between seal surfaces.

With respect to lateral or transverse movement of windowpane 14 at the beltline 18, the relatively increased compressibility of the body portion of the sealing strip as it approaches beltline 18 results in a window seal assembly which does not offer undue compressive resistance to such movement of the windowpane's transverse beltline edge 82. Thus the camming action required for full flush window movement is not impeded by the window seal assembly of the present invention.

A further feature of the window seal assembly of the present invention is the tear-away action of the magnetic seal. Such tear-away action is particularly advantageous in frameless window systems in which the window is directly sealed to the automotive vehicle body and opening of the door requires the breaking of the magnetic seal. When in sealing engagement with the windowpane in the ascended position, the sealing strip of the present invention has a tapered configuration, with the body portion being less compressed at the beltline than at the roofline. Upon opening of the door, the seal will naturally first break-away from beltline portion, and tear or peel away from the beltline to the roofline, allowing the door to be opened with ease. This offers an advantage over conventional magnetic seals utilizing sealing members which are uniformly configured in sealing engagement, since they required breaking of the magnetic seal at all points simultaneously. When the window is partially descended, the tear-away action is less pronounced but is offset by the decrease in length of engagement of the magnetic seal.

It should be understood that although the window seal assembly of the present invention is herein described as directed toward automotive side windows located between the vehicle's roofline and beltline, the window seal assembly of the present invention is not limited to automotive side windows. In accordance with the principles of the present invention, the window seal assembly of the invention can be employed in a variety of vehicle window openings, wherever any of its features as described herein would be desirable. For example, the window seal assembly can be used for vehicle "moonroofs", truck windows, locomotive windows or the like.

It should thus be appreciated that a latitude of modification, change and substitution is intended in the foregoing disclosure and, accordingly, it is appropriate that the appended claims be construed broadly and in a manner consistent with the spirit and the scope of the invention herein.

What is claimed is:

1. A window seal assembly for sealing a movable windowpane which opens and closes a window opening of a vehicle and which has edges flush with adjacent vehicle body panels when in a closed position, said window seal assembly comprising:
    an elongated flexible sealing strip having a first and a second end, said sealing strip comprising a laterally compressible body portion and a mounting portion for attaching said sealing strip to said vehicle;
    a first magnetic element attached to said body portion;
    a second magnetic element attached to an edge portion of said windowpane,
    said sealing strip having a tapered configuration when said window pane is in a closed position and said window seal assembly is in operative sealing engagement with said windowpane, said compressible body portion decreasing in width from said first end of sealing strip to said second end of sealing strip.

2. The window seal assembly of claim 1, wherein said sealing strip is compressively tapered.

3. The window seal assembly of claim 2, wherein at least one of said magnetic elements is a permanent magnet.

4. The window seal assembly of claim 2, wherein at least one of said magnetic elements is a ferrous metal.

5. A window seal assembly for a movable windowpane in a window opening of a vehicle, said windowpane having edges flush with adjacent vehicle body panels when in a closed position said window seal assembly comprising:
    an elongated flexible sealing strip comprising a compressible body portion, said body portion including a common wall, an outer wall and side walls extending therebetween, said walls defining a hollow interior of said body portion;
    a mounting portion for attaching said sealing strip to said vehicle extending from and sharing said common wall with said body portion;
    a first magnetic element embedded in said outer wall of said body portion;
    a second magnetic element complementary to said first magnetic element attached to a lateral edge of said windowpane for cooperative engagement with said first magnetic element,
    wherein when said sealing strip is in operative sealing engagement with said windowpane, said sealing strip is tapered along its length.

6. The window seal assembly of claim 5, wherein said first magnetic element is a flexible elastomeric magnet.

7. The window seal assembly of claim 5, wherein said side walls are bellowed.

8. The window seal assembly of claim 7, wherein said sealing strip is compressively tapered by selectively compressing said body portion along the length of said sealing strip and causing at least a portion of said bellowed side walls to compress in an accordian-like fashion.

9. The window seal assembly of claim 8, wherein said sealing strip is comprised of rubber.

10. The window seal assembly of claim 7, further comprising a ceramic layer on said lateral edge of said windowpane, where in said second magnetic element is bonded to said ceramic layer.

11. A window seal assembly for a frameless movable side windowpane of an automotive vehicle located between the beltline and roofline of said vehicle and forward of the B pillar of said vehicle, said window seal assembly comprising:
    an elongated flexible sealing strip comprising a compressible body portion, said body portion including a common wall, an outer wall and side walls extending therebetween, said walls defining a hollow interior of said body portion;
    a U-shaped mounting portion for attaching said sealing strip to the vehicle, said U-shaped mounting portion defining a U-shaped channel and said mounting portion including gripping ribs extending into said U-shaped channel;
    a flexible first magnetic element embedded in said outer wall of said body portion; and
    a second magnetic element complementary to said first magnetic element attached to a lateral edge of said windowpane,
    wherein said U-shaped mounting portion of sealing strip is mounted on a lateral edge of said B pillar adjacent to said lateral edge of said windowpane, said sealing strip being compressively tapered when in sealing engagement with said vehicle and said windowpane, said sealing strip being less compressed at the beltline relative to the roofline of the vehicle.

12. The window seal assembly of claim 11, wherein said windowpane is vertically and transversely movable.

13. A window seal assembly for sealing a movable windowpane which opens and closes a window opening of a vehicle to said vehicle, said window seal assembly comprising:
    an elongated flexible sealing strip having a first and a second end, said sealing strip comprising a compressible body portion and a mounting portion for attaching said sealing strip to said windowpane extending from said body portion;
    a first magnetic element attached to said body portion;
    a second magnetic element provided on said vehicle;
    said sealing strip having a tapered configuration when said window seal assembly is in operative sealing engagement with said windowpane, and compressible body portion decreasing in width from said first end of sealing strip to said second end of sealing strip.

14. The magnetic window seal assembly of claim 13, wherein said second magnetic element is provided by the body of said vehicle.

* * * * *

UNITED STATES PATENT AND TRADEMARK OFFICE
CERTIFICATE OF CORRECTION

PATENT NO. :  4,999,951

DATED :  March 19, 1991

INVENTOR(S) :  James F. Keys

It is certified that error appears in the above-identified patent and that said Letters Patent is hereby corrected as shown below:

ON THE TITLE PAGE:
  U.S. Patent Documents - insert --4,535,563  8/1985  Mesnel
          4,490,942  1/1985  Arnheim et al.--

Foreign Patent Documents - insert --6212414  1/1987  Japan
          6212415  1/1987  Japan
          2718448  11/1978  Germany--

Other Documents - insert --THE BLADE: Toledo, Ohio, October 5, 1988
          "Magnetic Interior Insulating Window System"--

Column 2, line 57, "to" should be --or--.

Column 2, line 61, "to" second occurrence, should be --or--.

Column 3, line 40, "16" should be --26--.

Column 4, line 34, "comprises" should be --comprised--.

UNITED STATES PATENT AND TRADEMARK OFFICE
CERTIFICATE OF CORRECTION

PATENT NO. : 4,999,951
DATED : March 19, 1991
INVENTOR(S) : James F. Keys It is certified that error appears in the above-identified patent and that said Letters Patent is hereby corrected as shown below:

Column 5, line 50, "tis" should be --its--.

Column 6, line 68, "required" should be --require--.

Column 8, line 18, "where in" should be --wherein--.

Column 8, line 62, "and" should be --said--.

Signed and Sealed this

Twenty-fifth Day of May, 1993

Attest:

MICHAEL K. KIRK

*Attesting Officer*   *Acting Commissioner of Patents and Trademarks*